(12) United States Patent
Mashitani et al.

(10) Patent No.: US 8,878,914 B2
(45) Date of Patent: Nov. 4, 2014

(54) STEREOSCOPIC IMAGE DISPLAY SYSTEM AND PROJECTION-TYPE IMAGE DISPLAY APPARATUS

(75) Inventors: Ken Mashitani, Hirakata (JP); Takashi Ikeda, Osaka (JP); Azusa Takeuchi, Moriguchi (JP)

(73) Assignee: Vision3D Technologies, LLC, Mountain View, CA (US)

( * ) Notice: Subject to any disclaimer, the term of this patent is extended or adjusted under 35 U.S.C. 154(b) by 711 days.

(21) Appl. No.: 12/695,848

(22) Filed: Jan. 28, 2010

(65) Prior Publication Data

US 2010/0188489 A1 Jul. 29, 2010

(30) Foreign Application Priority Data

Jan. 29, 2009 (JP) ................. 2009-018098
Jul. 28, 2009 (JP) ................. 2009-175415
Dec. 24, 2009 (JP) ................. 2009-293192

(51) Int. Cl.
*H04N 13/04* (2006.01)
*H04N 9/47* (2006.01)
*G02B 27/22* (2006.01)
*G03B 21/00* (2006.01)
*G02B 27/26* (2006.01)

(52) U.S. Cl.
CPC ............ *G03B 21/00* (2013.01); *H04N 13/047* (2013.01); *H04N 13/0497* (2013.01); *G02B 27/2228* (2013.01); *H04N 13/0429* (2013.01); *H04N 13/0459* (2013.01); *H04N 13/045* (2013.01); *G02B 27/26* (2013.01); *H04N 13/0447* (2013.01)
USPC .......................................... 348/53

(58) Field of Classification Search
USPC .............. 345/7, 32; 348/51, 53; 386/95, 124, 386/239; 359/559
See application file for complete search history.

(56) References Cited

U.S. PATENT DOCUMENTS

| | | | |
|---|---|---|---|
| 3,418,034 A * | 12/1968 | Ambrose | 359/472 |
| 5,982,342 A * | 11/1999 | Iwata et al. | 348/51 |
| 6,535,241 B1 * | 3/2003 | McDowall et al. | 348/51 |
| 2008/0252977 A1 * | 10/2008 | Iwamoto et al. | 359/559 |

(Continued)

FOREIGN PATENT DOCUMENTS

| | | |
|---|---|---|
| JP | 10-056654 | 2/1998 |
| JP | H11-341518 A | 12/1999 |
| JP | 2004-12628 A | 1/2004 |
| JP | 2007-97129 A | 4/2007 |

*Primary Examiner* — Y Lee
*Assistant Examiner* — Richard Carter
(74) *Attorney, Agent, or Firm* — DC Patent Lawyers, PLLC

(57) ABSTRACT

An image display unit, such as a projection-type image display apparatus, displays a first image and a second image, having a predetermined parallax relative to the first image, onto a predetermined display region by dividing the first image and the second image temporally or spatially. First eyeglasses are to be worn by a first viewer to see the first image and the second image displayed on the display region. Second eyeglasses are to be worn by a second viewer to see the first image and the second image displayed on the display region, and the second viewer faces the first viewer in a direction parallel to the plane of display. The first eyeglasses perform a function of having the right eye of the first viewer see the first image and having the left eye of the first viewer see the second image. The second eyeglasses perform a function of having the right eye of the second viewer see the second image and having the left eye of the second viewer see the first image.

6 Claims, 23 Drawing Sheets

(56) References Cited

U.S. PATENT DOCUMENTS

| | | | |
|---|---|---|---|
| 2009/0102915 A1* | 4/2009 | Arsenich | 348/53 |
| 2009/0142041 A1* | 6/2009 | Nagasawa et al. | 386/124 |
| 2009/0220213 A1* | 9/2009 | Ogawa et al. | 386/95 |
| 2012/0008914 A1* | 1/2012 | Sasaki et al. | 386/239 |
| 2012/0062711 A1* | 3/2012 | Ikeda et al. | 348/51 |
| 2012/0299802 A1* | 11/2012 | Yamazaki et al. | 345/32 |

\* cited by examiner

| 10 | Image display |
| 100 | Cabinet |
| 100a | Front cover |
| 100b | Back side |
| 100c | Top side |
| 100d | Protruding curved surface |
| 100e | Bottom face |
| 101 | Projection aperture |
| 102 | Handle |
| 102a | Handle part |
| 200 | Optical engine |
| 201 | Light source |
| 202 | Optical system |
| 203 | Liquid crystal panels |
| 205 | |
| 206 | Dichroic prism |
| 300 | Rear refracting optical system |
| 400 | Reflection mirror |
| 500 | Front refracting optical system |
| 600 | Mirror |

FIG.11

|  | PHASE 1 | PHASE 2 | PHASE 3 |
|---|---|---|---|
| DI1 | DISPLAYED | NOT DISPLAYED | NOT DISPLAYED |
| DI2 | NOT DISPLAYED | DISPLAYED | NOT DISPLAYED |
| DI3 | NOT DISPLAYED | NOT DISPLAYED | DISPLAYED |
| V1 | OFF/ON | ON/OFF | OFF/OFF |
| V2 | ON/OFF | OFF/ON | OFF/OFF |
| V3 | ON/OFF | OFF/OFF | OFF/ON |
| V4 | OFF/ON | OFF/OFF | ON/OFF |
| V5 | OFF/OFF | ON/OFF | OFF/ON |
| V6 | OFF/OFF | OFF/ON | ON/OFF |

STEREOSCOPIC IMAGE DISPLAY SYSTEM AND PROJECTION-TYPE IMAGE DISPLAY APPARATUS

This application is based upon and claims the benefit of priority from the prior Japanese Patent Applications No. 2009-018098, filed Jan. 29, 2009, Japanese Patent Applications No. 2009-293192, filed Dec. 24, 2009, and Japanese Patent Applications No. 2009-175415, filed Jul. 28, 2009, the entire contents of which are incorporated herein by reference.

BACKGROUND OF THE INVENTION

1. Field of the Invention

The present invention relates to a stereoscopic image display system and a projection-type image display apparatus capable of displaying parallax images so that viewers can see stereoscopic images.

2. Description of the Related Art

Human eyes are a few centimeters apart from each other, and this produces positional differences between images captured by the right eye and the left eye. The human brain uses these positional differences as clues in recognizing the depth in the image. Conversely speaking, it is possible to have the brain recognize the depth in an image illusively if the amount of positional difference between the images to be projected on the two eyes is adjusted. There are a variety of practically applied techniques utilizing this binocular parallax to have the brain recognize a 2D image as a 3D image. They are roughly classified into an eyeglasses method and a naked-eye method. The eyeglasses method includes a shutter glasses method, a polarized glasses method and an anaglyph glasses method, whereas the naked-eye method includes a parallax barrier method and a lenticular lens method.

Generally, a technique for displaying two kinds of images having a predetermined parallax therebetween by dividing them temporally or spatially is subject to limitations on the viewing positions from which stereoscopic images can be seen. That is, stereoscopic images are not recognized when viewed from directions where binocular parallax does not occur. For example, if two kinds of images are displayed on the floor in such a manner that parallax occurs when viewed from the direction of one particular side of a plane of display, then stereoscopic images cannot be recognized when viewed from the directions of the other sides thereof.

SUMMARY OF THE INVENTION

The present invention has been made in view of the foregoing circumstances, and a purpose thereof is to provide a technology for allowing recognition of stereoscopic images from a plurality of observation directions.

A stereoscopic image display system according to one embodiment of the present invention comprises: an image display unit which displays a first image and a second image, having a predetermined parallax relative to the first image, onto a predetermined display region by dividing the first image and the second image temporally or spatially; first eyeglasses to be worn by a first viewer who sees the first image and the second image displayed on the display region; and second eyeglasses to be worn by a second viewer who sees the first image and the second image displayed on the display region, the second viewer facing the first viewer in a direction parallel to a plane of display. The first eyeglasses perform a function of having a right eye of the first viewer see the first image and having a left eye thereof see the second image. The second eyeglasses perform a function of having a right eye of the second viewer see the second image and having a left eye thereof see the first image.

Another embodiment of the present invention relates also to a stereoscopic image display system. This stereoscopic image display system comprises: an image display unit which displays three or more images, having predetermined parallaxes therebetween, onto a predetermined display region by dividing the three or more images temporally or spatially; and eyeglasses to be worn by a viewer who sees the images displayed on the display region. The eyeglasses are identified based on the position of the viewer wearing said eyeglasses, and the eyeglasses perform a function of having the viewer see two of the three or more images.

Still another embodiment of the present invention relates to a projection-type image display apparatus. This apparatus comprises: a projection unit which projects a plurality of images, having predetermined parallaxes therebetween, onto a predetermined display region by dividing the plurality of images temporally or spatially; and a synchronization signal transmitter which transmits a predetermined synchronization signal to first eyeglasses to be worn by a first viewer who sees a first image and a second image displayed on the display region and second eyeglasses to be worn by a second viewer who sees the first image and the second image displayed on the display region, the second viewer facing the first viewer in a direction parallel to a plane of display.

Optional combinations of the aforementioned constituting elements, and implementations of the invention in the form of methods, apparatuses, systems, and so forth may also be effective as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 3A shows a state of glasses in which they must be worn by a first viewer, and FIG. 3B shows a state of glasses in which they must be worn by a second viewer;

FIG. 5A shows glasses to be worn by a first viewer;

FIG. 5B shows glasses to be worn by a second viewer;

FIG. 7A is an internal perspective view of a projection-type image display apparatus viewed laterally;

FIG. 7B is an internal perspective view of a projection-type image display apparatus viewed from top and mainly shows an arrangement of each optical component in an optical engine;

FIG. 9A is a side view of a space stretching out of a plane of display in a display region;

FIG. 9B is a top view (part 1) of a display region;

FIG. 9C is a top view (part 2) of a display region;

FIG. 11 is a table that integrates the display timings of a first image, a second image and a third image with the open-close timings of shutter glasses to be worn by a first viewer to a sixth viewer, based on the assumption indicated in an example shown in FIG. 10;

DETAILED DESCRIPTION OF THE INVENTION

The invention will now be described by reference to the preferred embodiments. This does not intend to limit the scope of the present invention, but to exemplify the invention.

First Embodiment

Figure 1:
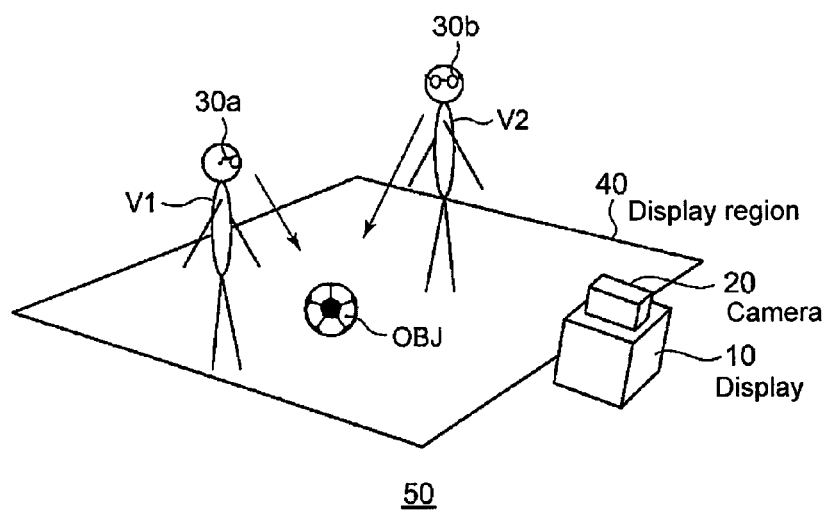
FIG. 1 is an illustration showing an arrangement of an image display system according to a first embodiment of the present invention.

FIG. 1 is an illustration showing an arrangement of an image display system 50 according to a first embodiment of the present invention. The image display system 50 includes a projection-type image display apparatus 10, a camera 20, first eyeglasses 30a, and second eyeglasses 30b.

Arrangement of Image Display System

The projection-type image display apparatus 10 as an image display unit displays a first image and a second image, having a predetermined parallax relative to the first image, onto a predetermined display region 40 by dividing the first and second images temporally or spatially. This projection-type image display apparatus 10 is a projector, fitted with a short focus lens, which can be installed on the floor. The display region 40 may be a screen installed on the floor or the floor itself serving as a plane of display.

A first viewer V1 and a second viewer V2 stand inside or outside of the plane of display and look down at images displayed on the display region 40. It should be appreciated that the display region 40 is not limited to one formed on the floor, but it may be formed on the ceiling, for instance. In such a case, the first viewer V1 and the second viewer V2 look up at images displayed on the display region 40.

It should be noted also that the above-described image display unit is not limited to an arrangement constituted by the projection-type image display apparatus 10 projecting images onto the display region 40, but the arrangement may be constituted by a liquid crystal display or a plasma display instead. That is, it may be any arrangement that can display the first image and the second image on a predetermined plane of display by dividing them temporally or spatially.

Where the shutter glasses method is employed, the projection-type image display apparatus 10 displays a first image and a second image in a time-division manner. In an example as shown in FIG. 1, an image for the right eye and an image for the left eye are displayed alternately. Where the polarized glasses method is employed, the projection-type image display apparatus 10 displays a first image and a second image in a space-division manner. In the case of FIG. 1, an image with the pixels of an image for the right eye and an image for the left eye superimposed on each other is displayed.

The camera 20 (e.g., a CCD camera) takes an image which at least includes a space extending perpendicularly from the display region 40 and its plane of display and supplies it to the projection-type image display apparatus 10. It is desirable that the composition of the image covers all the motion range of the first viewer V1 and the second viewer V2.

The first eyeglasses 30a are worn by the first viewer V1 to see the first image and the second image displayed on the display region 40. The second eyeglasses 30b are worn by the second viewer V2, who faces the first viewer V1 in a direction parallel to the plane of display, to see the first image and the second image displayed on the display region 40.

When the first image and the second image are displayed on the plane of display formed on the floor, the first eyeglasses 30a are on the first viewer V1 who is in a first position inside or outside of the plane of display. The second eyeglasses 30b are on the second viewer V2 who is positioned in a direction where he/she faces the first viewer V1 in the first position with an object OBJ (a soccer ball in FIG. 1) displayed on the plane of display in between them. For example, the first viewer V1 and the second viewer V2 may look down at the first image and the second image from the opposing sides of the display region 40.

The first eyeglasses 30a perform the function of having the right eye of the first viewer V1 see the first image and the left eye thereof see the second image. The second eyeglasses 30b perform the function of having the right eye of the second viewer V2 see the second image and the left eye thereof see the first image. In other words, the first eyeglasses 30a and the second eyeglasses 30b perform inverted functions with respect to each other. Where the shutter glasses method is employed, the right-eye shutter and the left-eye shutter are controlled in such a manner that their opening and closing are reversed between the first eyeglasses 30a and the second eyeglasses 30b.

Example of Object Display

Figure 2:
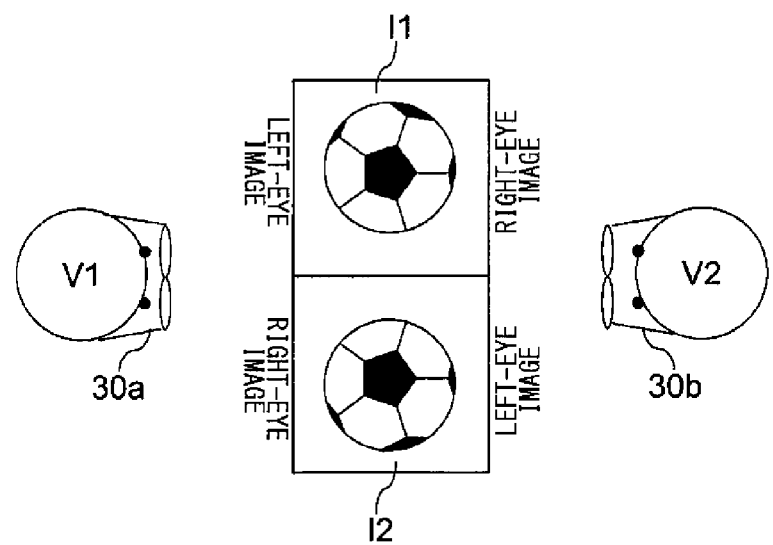
FIG. 2 is an illustration showing examples of a first image and a second image of an object.

FIG. 2 is an illustration showing examples of a first image I1 and a second image I2 of an object OBJ. In the real world, the positional relationship between the right eye and the left eye is reversed between the first viewer V1 and the second viewer V2 when they face each other and see the object OBJ. That is, the face of the object OBJ seen by the right eye of the first viewer V1 is the face of the object OBJ seen by the left eye of the second viewer V2.

In FIG. 2, the first viewer V1, who is on the left side of the first image I1 and second image I2 of the object OBJ, sees the first image I1 with the right eye and the second image I2 with the left eye. The second viewer V2, who is on the right side of the first image I1 and second image I2 of the object OBJ, sees the first image I1 with the left eye and the second image I2 with the right eye. The object OBJ, when viewed with the lines of sight of the two eyes crossed halfway like this, looks as if it is popping out toward the viewer.

Note here that in the use of the shutter glasses method, for instance, if the opening and closing operation of the shutter glasses worn by the first viewer V1 and the second viewer V2 is the same, then the right-eye image for the first viewer V1 will be viewed by the right eye of the second viewer V2 and the left-eye image for the first viewer V1 will be viewed by the left eye of the second viewer V2. This results in either one of the viewers failing to have a correct stereoscopic view. Therefore, the shutter glasses worn by the first viewer V1 and the second viewer V2 must be controlled such that their opening and closing operation is reversed with respect to each other. In this manner, both the first viewer V1 and second viewer V2 can see stereoscopic images.

To enable the reversion of the opening and closing operation of the shutter glasses worn by the first viewer V1 and the second viewer V2, two types of shutter glasses may be prepared or a switch for inverting the opening and closing operation may be added to the same type of shutter glasses provided that a single type of synchronization signal is used.

Figure 3A:
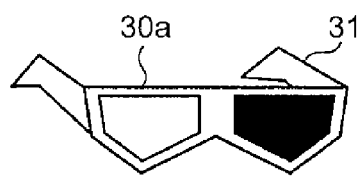
FIGS. 3A and 3B illustrate a pair of shutter glasses of a structure that allows inverting the direction of arms.
Figure 3B:
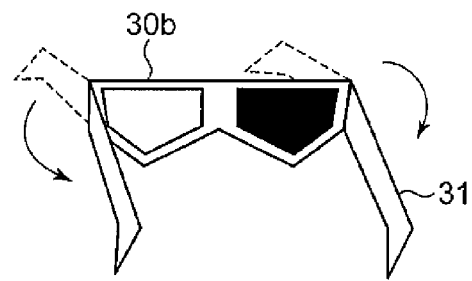

The shutter glasses to be used may be of a structure that allows the direction of arms to be inverted. FIGS. 3A and 3B illustrate a pair of shutter glasses of a structure that allows inverting the direction of arms 31. FIG. 3A shows the state of glasses 30a in which they must be worn by the first viewer V1, and FIG. 3B shows the state of glasses 30b in which they must be worn by the second viewer V2.

Figure 4:
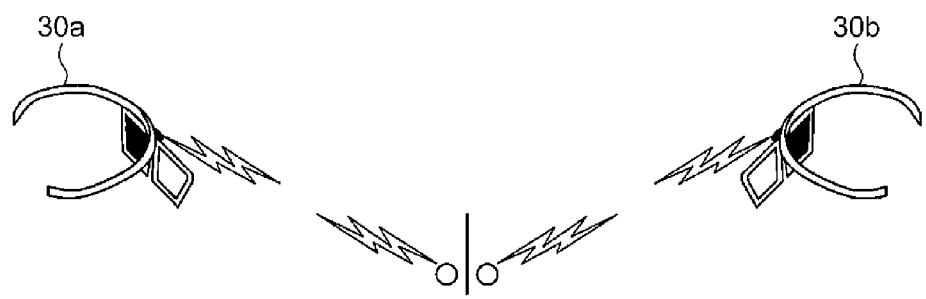
FIG. 4 illustrates two pairs of glasses that receive two types of synchronization signals wirelessly.
Figure 5A:
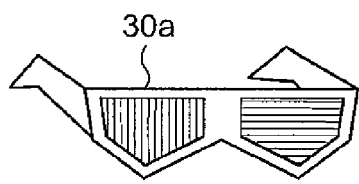
FIGS. 5A and 5B illustrate linearly polarized glasses with vertical and horizontal filters.
Figure 5B:
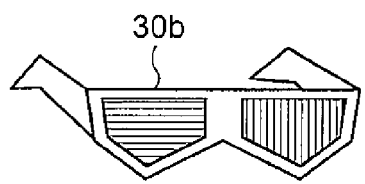

The arrangement may be such that directionality is given to the viewers by two types of synchronization signals staggered by a half cycle that are transmitted from the projection-type image display apparatus 10. FIG. 4 illustrates two pairs of glasses that receive the two types of synchronization signals wirelessly. Glasses 30a to be worn by the first viewer V1 and glasses 30b to be worn by the second viewer V2 are controlled such that their opening and closing operation is reversed with respect to each other.

Where the polarized glasses method is used, two types of glasses with reversed right and left polarizations may be prepared, and the glasses may be worn by the first viewer V1 and the second viewer V2, respectively. FIGS. 5A and 5B illustrate linearly polarized glasses with vertical and horizontal filters. FIG. 5A shows glasses 30a to be worn by the first viewer V1, and FIG. 5B glasses 30b to be worn by the second viewer V2.

Also, when the anaglyph glasses method, which separates images according to wavelength bands of light, is employed, the arrangement may be such that the right and left filters are reversed. Therefore, the present embodiment can be implemented by any method that uses eyeglasses capable of viewing separate images as described above.

With linearly polarized glasses with vertical and horizontal filters, circularly polarized glasses and anaglyph glasses, the positional relationship of their right and left filters can be reversed provided that they are of a structure that allows inverting the direction of the arms 31 as shown in FIGS. 3A and 3B. That is, the functions of the right and left filters can be reversed.

Figure 6:
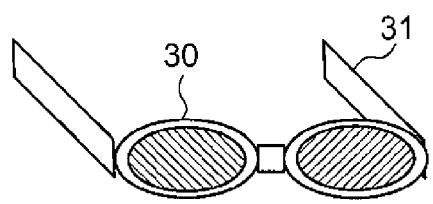
FIG. 6 illustrates linearly polarized glasses with oblique filters.

FIG. 6 illustrates linearly polarized glasses with oblique filters. With these glasses 30, no reversal of functions of the right and left filters occurs even if the arms 31 are inverted. Hence, the arrangement must be such that the arms 31 are so shaped that the glasses 30 can be worn in normal orientation or upside down. The reversal of functions of the right and left filters can be accomplished by wearing these glasses 30 upside down.

Structure of Projection-Type Image Display Apparatus

Figure 7B:
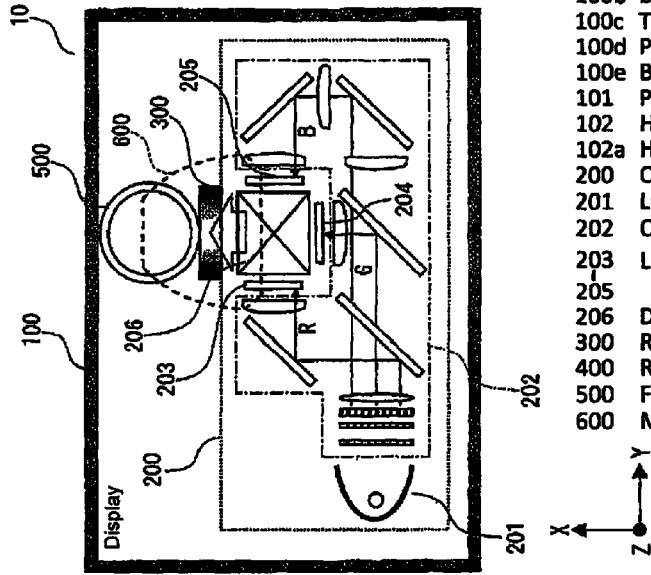
FIGS. 7A and 7B each shows an internal structure of a projection-type image display apparatus according to a first embodiment of the present invention.
Figure 7A:
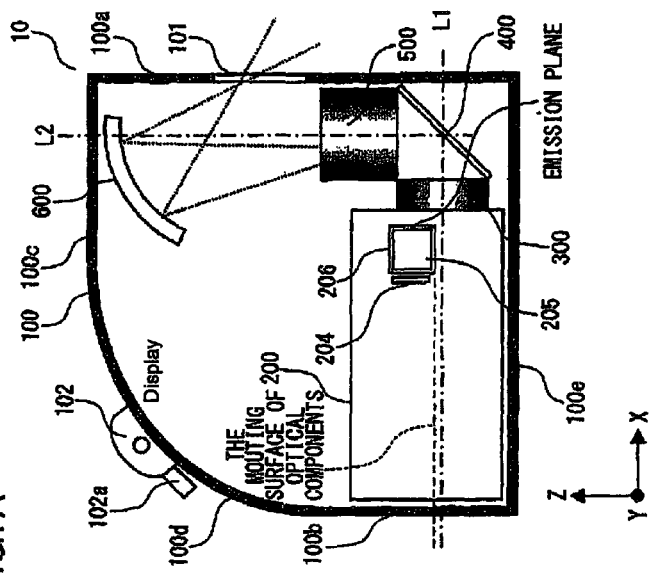

FIGS. 7A and 7B each show an internal structure of the projection-type image display apparatus 10 according to the first embodiment. FIG. 7A is an internal perspective view of the projection-type image display apparatus 10 viewed laterally. FIG. 73 is an internal perspective view of the projection-type image display apparatus 10 viewed from top and mainly shows an arrangement of each optical component in an optical engine 200.

Referring to FIGS. 7A and 7B, the projection-type image display apparatus 10 includes a cabinet 100. A projection aperture 101 is formed on a front cover 100a of the cabinet 100. A protruding curved surface 100d is formed on a region leading from a back side 100b to a top side 100c, and a handle 102 is provided on the protruding curved surface 100d. The handle 102 has a handle part 102a which is rotatable in an X-Z plane direction.

An optical engine 200, a rear refracting optical system 300, a reflection mirror 400, a front refracting optical system 500, and a curved mirror 600 are placed inside the cabinet 100.

The optical engine 200, disposed at the bottom of the cabinet 100, generates image light modulated in response to image signals. Optical components that include a liquid-crystal panel, a dichroic prism, and so forth are placed in predetermined positions in a casing of the optical engine 200. The mounting surface of each optical component is approximately parallel to a bottom face 100e of the cabinet 100.

As shown in FIG. 7B, the optical engine 200 includes a light source 201, a light guiding optical system 202, three transmission-type liquid crystal display panels 203, 204 and 205, and a dichroic prism 206.

The white light emitted from the light source 201 is dispersed into light of red wavelength band (hereinafter referred to as "R light"), light of green wavelength band (hereinafter referred to as "G light"), and light of blue wavelength band (hereinafter referred to as "B light") by the light guiding optical system 202. The thus split lights are irradiated to the liquid crystal panels 203, 204 and 205, respectively. The R light, the G light and B light modulated by the liquid crystal panels 203, 204 and 204 are subjected to color synthesis by the dichroic prism 206 so as to be emitted as image light. Polarization plates, which are not shown here, are placed on light entering sides and light outgoing sides of the liquid crystal panels 203, 204 and 205.

Reflective liquid crystal panels or MEMS (Micro Electro-Mechanical System) devices may be used as light modulation devices to be placed in the optical engine 200, instead of the above-described liquid crystal panels 203, 204 and 205. When the liquid crystal panels are to be used, a single-panel optical system may be employed using a color wheel instead of the above-described three-panel optical system.

The rear refracting optical system 300 is mounted in an image light exit opening of the optical engine 200. The image light generated by the optical engine 200 enters into the rear refracting optical system 300. The rear refracting optical system 300 includes a plurality of lenses wherein an optical axis L1 of these lenses are parallel to the bottom face 100e (X axis) of the cabinet 100. As shown in FIG. 7A, the liquid crystal panels 203, 204 and 205 and the dichroic prism 206 are arranged such that they are slightly shifted from an optical axis L1 of the rear refracting optical system 300 in the Z axis direction (toward a curved mirror 600 side).

The reflection mirror 400 is provided in front of the rear refracting optical system 300. The reflection mirror 400 is disposed perpendicular to the X-Z plane and tilted by 45 degrees relative to the bottom face 100e (X-Y plane) of the cabinet 100.

The front refracting optical system 500 is disposed above the reflection mirror 400. The front refracting optical system 500 has a plurality of lenses, and an optical axis L2 of these lenses is parallel to the Z axis and also parallel to an image light emission surface of the dichroic prism 206. The optical axis L2 of the front refracting optical system 500 is perpendicular to the optical axis L1 of the rear refracting optical system 300 and the bottom face 100e of the cabinet 100. Also, the optical axis L2 of the front refracting optical system 500 intersects with the optical axis L1 on the reflection mirror 400. That is, the front refracting optical system 500, combined with the rear refracting optical system 300, constitutes a refracting optical system. The optical axis of a lens group is converted from the direction perpendicular to the emission surface of the dichroic prism 206 into the direction parallel thereto by the reflection mirror 400 interposed between the two refracting optical systems 300 and 500.

The image light having entered the rear refracting optical system 300 enters the curved mirror 600, disposed above the front refracting optical system 500, by way of the reflection mirror 400 and the front refracting optical system 500.

The curved mirror 600 is of a concave shape. As shown in FIG. 7A, the curved mirror 600 has an effective reflection region on an optical engine 200 side of the front refracting optical system 500 away from the optical axis L2 thereof. The curved mirror 600 may be of an aspherical shape, a free-form surface shape or a spherical shape.

The image light having entered the curved mirror 600 is reflected by the curved mirror 600 and is magnified and projected onto a projection surface after passing through the projection aperture 101. At this time, the image light is most converged near the projection aperture 101 and then the most converged image light is magnified.

Functions of Projection-Type Image Display Apparatus

Figure 8:
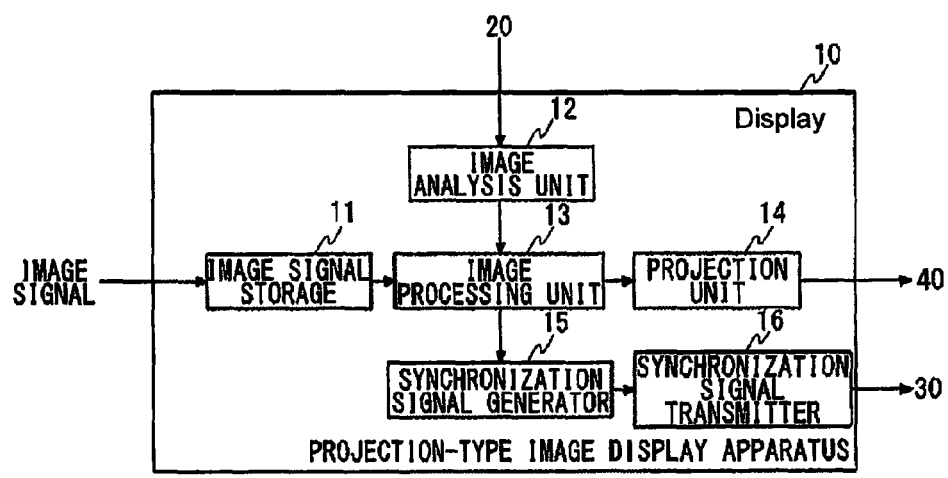
FIG. 8 is a functional block diagram showing functions of a projection-type image display apparatus according to a first embodiment of the present invention.

FIG. 8 is a functional block diagram showing functions of the projection-type image display apparatus 10 according to the first embodiment. The projection-type image display apparatus 10 includes an image signal storage 11, an image analysis unit 12, an image processing unit 13, a projection unit 14, a synchronization signal generator 15, and a synchronization signal transmitter 16. The structure of the projection-type image display apparatus 10 may be implemented hardwarewise by arbitrary processor, memory and other LSIs, and softwarewise by memory-loaded programs or the like. Depicted herein are functional blocks implemented by cooperation of hardware and software. Therefore, it will be obvious to those skilled in the art that the functional blocks may be implemented by a variety of manners including hardware only, software only or a combination of both.

The image signal storage 11 stores image signals supplied from an external source. The image analysis unit 12 analyzes an image taken by the camera 20. Here, the motion of a viewer in said image is analyzed. For example, a difference between the image taken by the camera 20 and an image being actually projected is calculated so as to analyze the motion of a viewer.

The image processing unit 13 processes an image signal stored in the image signal storage 11, according to an analysis result from the image analysis unit 12. For example, in an application of a soccer game as shown in FIG. 1, a playing field and a soccer ball are displayed on a projection image. If the viewer performs a motion of kicking the ball on a display screen, the image analysis unit 12 will detect an object, which is different from the above-described projection image, around the soccer ball within the image taken by the camera 12. Upon receipt of this detection result, the image processing unit 13 generates an image where the soccer ball moves in the direction that said object moves. More specifically, the image processing unit 13 generates the image where the position of the soccer ball on the current projection image is corrected.

Though the speed of the soccer ball is basically determined proportionally to the traveling speed of the aforementioned object, it can be freely set to any speed. For example, assume that a viewer enters his/her age before the game starts. If the first viewer V1 is senior to the second viewer V2, the speed at which the first viewer V1 kicks the ball to the second viewer V2 is set slower than the speed at which the second viewer kicks it to the first viewer V1. In this manner, the game can be enjoyed equally by the both viewers in a virtual game though there is a difference in skill and speed between them in the real world. As for the viewers' ages, the taller viewer may be determined to be older than the other, for example, by estimating the actual body heights of the viewers in the images captured by the camera 20.

Further, the stereoscopic image display may add the vertical motions in the soccer ball. Various special effects, such as a ball sinking in the ground, a moving ball that floats above, and a ball floating around but making a sudden movement, may be produced and staged.

The projection unit 14 projects light according to the images generated by the image processing unit 13, onto the display region 40. The synchronization signal generator 15 generates a signal synchronous with the projection timing of each frame image outputted from the projection unit 14. The synchronization transmitter 16 transmits the synchronization signal generated by the synchronization generator 15 to the eyeglasses 30 by infrared communication or other short-range radio communications. Note that the synchronization signal generator 15 and the synchronization signal transmitter 16 are components required only when the shutter glasses method is employed and therefore those components are not required when the polarized glasses method is employed. Note also that though a single type of synchronization signal needs to be transmitted when a plurality of kinds of shutter glasses are used as shown in FIG. 3, a plurality of types of synchronization signals need to be transmitted when a single type of shutter glasses are used as shown in FIG. 4.

Suitability of Objects

Now, what type of object OBJ is suitable for a display will be considered and examined here. Normally, an image properly seen from the first viewer V1 is an image having a surface of the object OBJ observed from the first viewer V1. Accordingly, the image having said surface thereof to be observed is not seen from the second viewer V2 and, instead, the image observed by the second viewer V2 is reversed at both front to rear and top to bottom. In this manner, there are many cases where an object OBJ having clear front-to-back and top-to-bottom cannot achieve a proper stereoscopic view. In contrast to this, if an object OBJ is bilaterally and vertically symmetric like a soccer ball, no sense of discomfort will be felt when viewed from the first viewer V1 and the second viewer V2. For example, a rugby ball, a jewel or the like is suitable for the object OBJ. A regular polyhedron is more preferable. Note that it is desirable that a ball be not shaded because shading the ball expresses an up-down relationship.

Figure 9A:
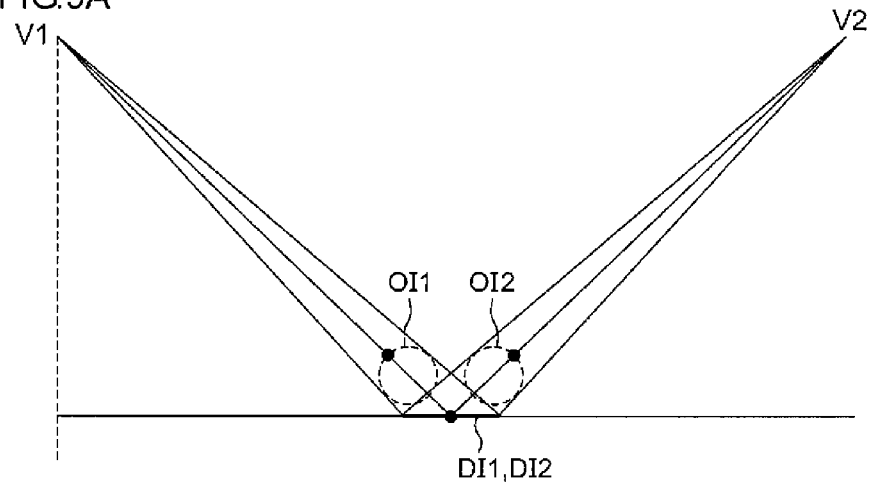
FIGS. 9A to 9C each illustrates a relationship between the images of an object displayed on a display region and the images sensed and felt by a first viewer and a second viewer.
Figure 9B:
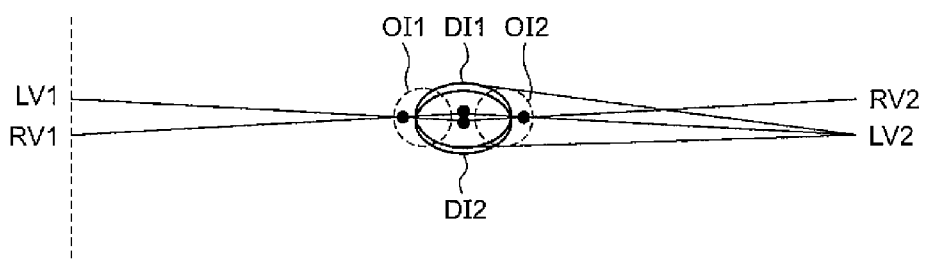
Figure 9C:
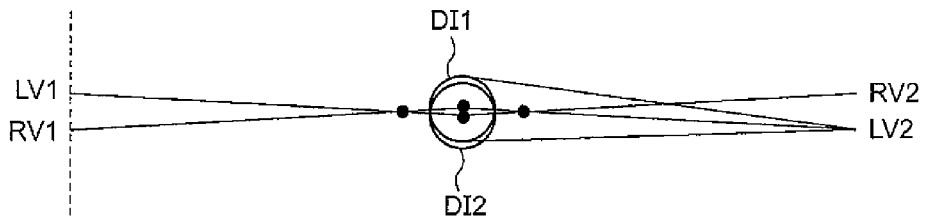

FIGS. 9A to 9C each illustrates a relationship between images DI1 and DI2 of the object OBJ displayed on the display region 40 and images OI1 and OI2 sensed and felt by the first viewer V1 and the second viewer V2. FIG. 9A is a side view of a space stretching out of the plane of display in the display region 40. The images DI1 and DI2, having predetermined parallaxes, of two kinds of objects OBJ are displayed alternately in the display region 40.

Since both the first viewer V1 and the second viewer V2 are not looking at the images DI1 and DI2 of the object OBJ from top of the display region 40, the positions at which the stereoscopic view can be sensed are closer to the respective viewers. In other words, when viewed from an observation point V1 of the first viewer V1, the image OI1 of the object OBJ is sensed at a position closer toward the viewer himself/herself (first viewer V1) than the positions of the images DI1 and DI2 displayed. Similarly, when viewed from an observation point V2 of the second viewer V2, the image OI2 of the object OBJ is sensed at a position closer toward the viewer himself/herself (second viewer V2) than the positions of the images DI1 and DI2 displayed. From these facts, it may be concluded that it is desirable that the shadow of the object OBJ and the like should not be displayed on the ground (a plane of the display region 40). This is because the positions of the object OBJ sensed by a plurality of viewers differ from one another.

FIG. 9B is a top view (part 1) of the display region 40. Since both the first viewer V1 and the second viewer V2 are not looking at the images DI1 and DI2 of the object OBJ from top of the display region 40, the viewers sense objects OBJ as if they shrank back and forth from the images DI1 and DI2 of the object OBJ. In the light of the foregoing, the images DI1 and DI2 of the object OBJ are elongated in the direction of opposing lines between the first viewer V1 and the second viewer V2, and then displayed on the display region 40. As a result, the image OI1 of the object OBJ sensed by a right-eye viewpoint RV1 and a left-eye viewpoint LV1 of the first viewer V1 is a circle. Similarly, the image OI2 of the object OBJ sensed by a right-eye viewpoint RV2 and a left-eye viewpoint LV2 of the second viewer V2 is a circle.

FIG. 9C is a top view (part 2) of the display region 40. FIG. 9C shows an example where the images DI1 and DI2 of the object OBJ displayed on the display region 40 are circles. In this case, the first viewer V1 and the second viewer V2 sense objects OBJ shrunk in said opposite line direction. It goes without saying that if this deformation is small enough to be negligible, the images DI1 and DI2 of the circular objects OBJ may be displayed. For clarification of explanation, FIG. 2 is depicted such that no overlapping occurs between the first image I1 and the second image I2. In some actual cases, the images DI1 and DI2 may be displayed in an overlapped manner, as shown in FIG. 9B and FIG. 9C, depending on how much the object OBJ is to be projected or popped out.

According to the above-described first embodiment, viewers, who face each other in the direction parallel to the plane of display, wear two sets of eyeglasses that perform inverted functions with respect to each other. As a result, the stereoscopic images can be recognized from the both viewers' directions.

Second Embodiment

Next, a description is given of an image display system 50 according to a second embodiment of the present invention. In the second embodiment, it is presupposed that there are three or more viewers.

Example of Object Display

Figure 10:
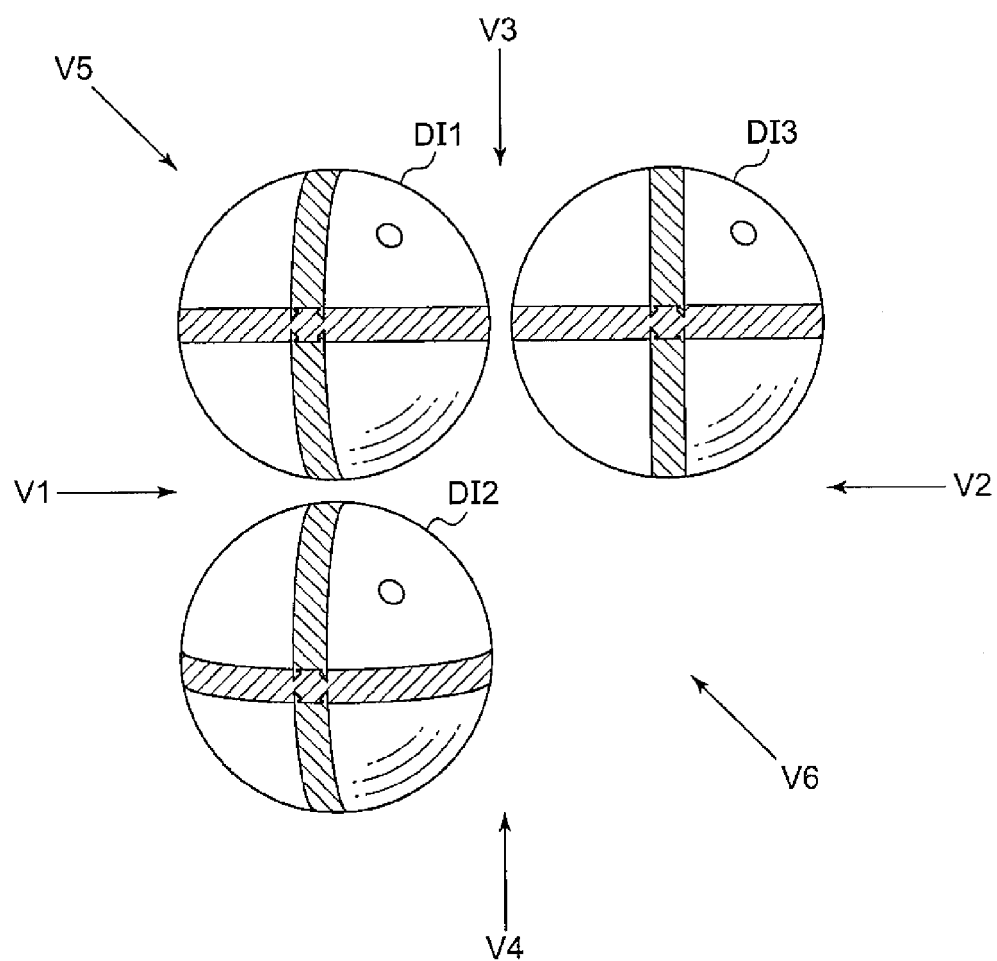
FIG. 10 shows a first image, a second image and a third image of an object, to be displayed on a display region, as viewed from top of a display region.

FIG. 10 shows a first image DI1, a second image DI2 and a third image DI3 of an object OBJ, to be displayed on a display region 40, as viewed from top of the display region 40. The first image DI1, the second image DI2 and the third image DI3 of the object OBJ have their respective predetermined parallaxes and are displayed in a time-division manner. Assume here that these images are observed by six viewers. A first viewer V1 and a second viewer V2 see a pair of first image DI1 and second image DI2. A third viewer V3 and a fourth viewer V4 see a pair of first image DI1 and third image DI3. A fifth viewer V5 and a sixth viewer V6 see a pair of second image DI2 and third image DI3.

FIG. 11 is a table that integrates the display timings of the first image DI1, the second image DI2 and the third image DI3 with the open-close timings of shutter glasses to be worn by the first viewer V1 to the sixth viewer V6, based on the assumption indicated in the example shown in FIG. 10. One unit of frame image is displayed at 180 Hz on the assumption that the first image DI1, the second image DI2 and the third image DI3 are each displayed at 60 Hz.

In a first phase of one unit thereof, control is performed such that the first image DI1 is displayed and the second image DI2 and the third image DI3 are not displayed. Control is performed such that a right-eye shutter of the first viewer V1, a left-eye shutter of the second viewer V2, a left-eye shutter of the third viewer V3 and a right-eye shutter of the fourth viewer V4 are in the open positions and the other shutters are in the closed positions.

In a second phase, control is performed such that the second image DI2 is displayed and the first image DI1 and the third image DI3 are not displayed. Control is performed such that a left-eye shutter of the first viewer V1, a right-eye shutter of the second viewer V2, a left-eye shutter of the fifth viewer V5 and a right-eye shutter of the sixth viewer V6 are in the open positions and the other shutters are in the closed positions.

In a third phase, control is performed such that the third image DI3 is displayed and the first image DI1 and the second image DI2 are not displayed. Control is performed such that a right-eye shutter of the third viewer V3, a left-eye shutter of the fourth viewer V4, a right-eye shutter of the fifth viewer V5 and a left-eye shutter of the sixth viewer V6 are in the open positions and the other shutters are in the closed positions.

Figure 12:
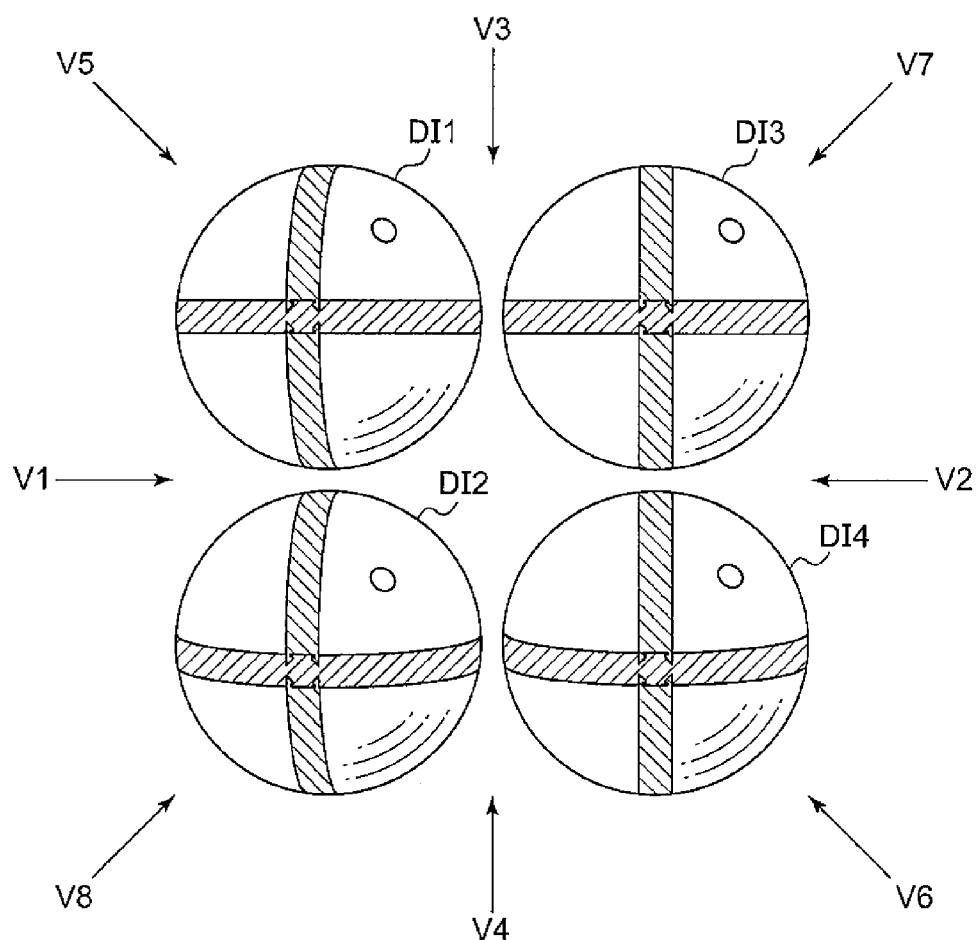
FIG. 12 shows a first image, a second image, a third image and a fourth image of an object, to be displayed on a display region, as viewed from top of a display region.

FIG. 12 shows a first image DI1, a second image DI2, a third image DI3 and a fourth image DI4 of an object OBJ, to be displayed on the display region 40, as viewed from top of the display region 40. The first image DI1, the second image DI2, the third image DI3 and the fourth image DI4 of the object OBJ have their respective predetermined parallaxes and are displayed in a time-division manner. Assume here that these images are observed by eight viewers.

A first viewer V1 sees a pair of third image DI3 and fourth image DI4. A second viewer V2 sees a pair of first image DI1 and second image DI2. A third viewer V3 sees a pair of second image DI2 and fourth image DI4. A fourth viewer V4 sees a pair of first image DI1 and third image DI3. A fifth viewer V5 and a sixth viewer V6 see a pair of second image DI2 and third image DI3. A seventh viewer V7 and an eighth viewer V8 see a pair of first image DI1 and fourth image DI4.

Though the first viewer V1 may see a pair of first image DI1 and second image DI2, the first viewer V1 preferably sees a pair of images lying farther away from the viewer himself/herself. This is because, as already discussed in FIGS. 9A to 9C, the position of the image sensed by the viewer is closer to the viewer himself/herself than the positions of the displayed image. The same applies to the second viewer V2 to the fourth viewer V4.

Further increasing the number of images DI of the object OBJ which can be displayed by one unit achieves the stereoscopic images from an increased plurality of directions.

According to the above-described second embodiment, the stereoscopic images can be recognized from three or more directions by dividing the three or more images each having a predetermined parallax temporally or spatially.

First Method for Determining a Viewing Direction

A description has been given of a case where if there are three or more viewers, the three or more viewers can recognize the stereoscopic images from a plurality of directions by appropriately adjusting the respective open/close timings of the shutter glasses worn by the viewers. In such a case, a pair of images to be seen by the left eye and the right eye of each viewer is predetermined.

However, as the number of viewers increases, it gets confused as to how each viewer shall set the open/close timing of the shutter glasses to see a particular image pair. Also, as a viewer moves from one place to another and thereby the direction from which the viewer sees the object changes, there is a problem where the stereoscopic image cannot be recognized with the open/close timing which has been originally set according to an initial viewing direction. In the light of this problem, a description is hereinbelow given of an image display system which automatically sets the open/close timing of the shutter glasses when the projection-type image display apparatus projects the display region on the floor.

Figure 13:
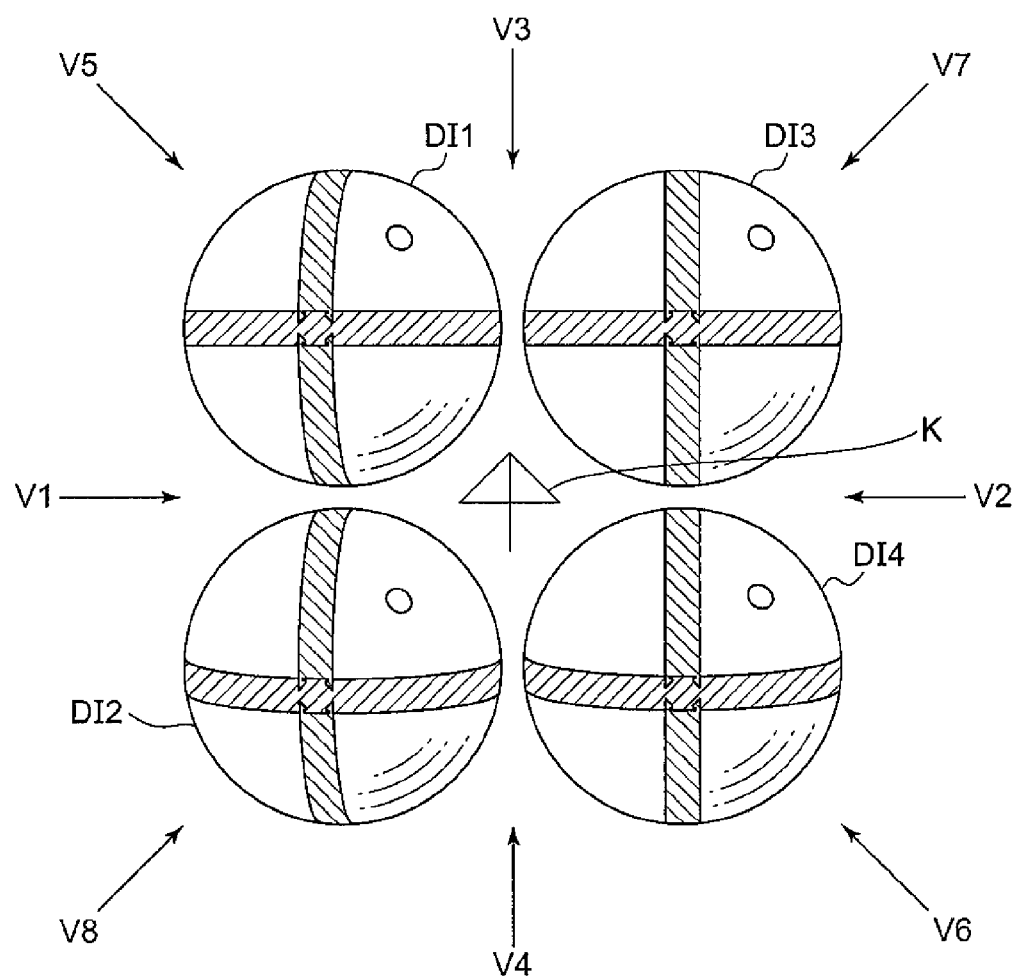
FIG. 13 shows a first image, a second image, a third image and a fourth image of an object, to be displayed on a display region, as viewed from top of a display region.

FIG. 13 shows a first image DI1, a second image DI2, a third image DI3 and a fourth image DI4 of an object OBJ, to be displayed on the display region 40 in the image display system, as viewed from top of the display region 40. The first image I11, the second image DI2, the third image DI3 and the fourth image DI4 of the object OBJ have their respective predetermined parallaxes and are displayed in a time-division manner.

The image display system includes the projection-type image display apparatus 10 shown in FIG. 7 and shutter glasses capable of opening and closing the left-eye and right-eye shutters. The object OBJ is projected on the floor, where viewers exist, by the projection-type image display apparatus 10. Assume here that the object OBJ is observed from the eight directions V1 to V8 as shown in FIG. 13. An image K used to verify the orientation (hereinafter referred to as "orientation confirmation image K") is shown in FIG. 13, in addition to the object OBJ. The orientation confirmation image K will be discussed in detail later.

The shutter glasses that each viewer wears are provided with a compact camera, such as a CCD (Charge-Coupled Device) camera, a control unit comprised of hardware, such as CPU, ROM and RAM, and programs in cooperation with the hardware, and a receiver which receives synchronization signals from the projection-type image display apparatus 10.

Figure 14:
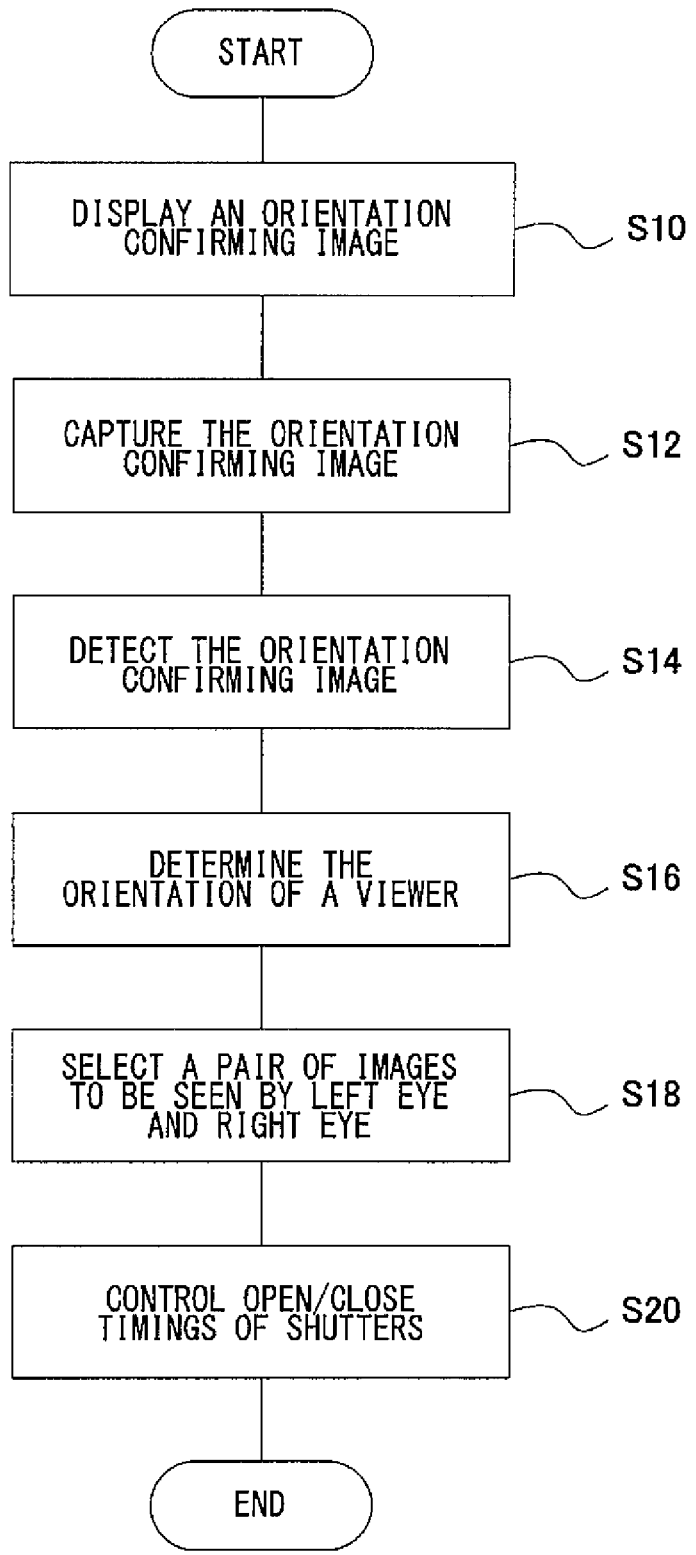
FIG. 14 is a flowchart explaining a process for setting the open/close timing of shutter glasses.

FIG. 14 is a flowchart explaining a process for setting the open/close timing of the shutter glasses.

With a viewer existing on the periphery of the display region 40 of an object OBJ, the projection-type image display apparatus first projects the orientation confirmation image K in addition to the object OBJ (S10). The orientation confirmation image K may be of an arbitrary shape such that how the orientation image K is seen differs when viewed from the eight viewing directions V1 to V8. An arrow is indicated, as the orientation confirmation image K, in FIG. 13. The orientation confirmation image K is displayed with the same timings as the display timings of the parallax images DI1 to DI3.

The compact camera attached to the shutter glasses worn by each viewer takes an image of a region containing the orientation confirmation image (S12). Using a technique such as pattern matching performed to determine which one matches most appropriately with any of different direction patterns recorded beforehand, a control unit in the shutter camera detects the orientation confirmation image K from the image-taken region (S14) and determines the orientation of a viewer who is seeing the display region, from among V1 to V8, based on the orientation of the orientation confirmation image (S16).

Figure 15A:
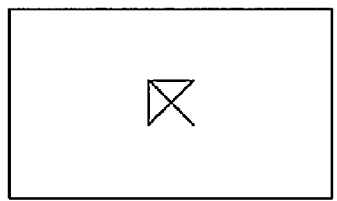
FIGS. 15A and 15B illustrate examples to explain how an orientation confirmation image is seen.
Figure 15B:
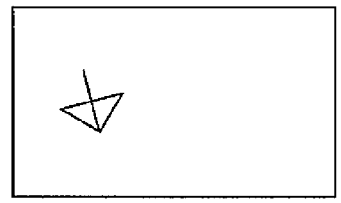

FIGS. 15A and 15B illustrate examples to explain how an orientation confirmation image K is seen. FIG. 15A illustrates how the orientation confirmation image K is seen when the objection OBJ is observed from the viewing direction V8. FIG. 15B illustrates how the orientation confirmation image K is seen when the objection OBJ is observed from the viewing direction V3. That is, detecting the orientation confirmation image determines which direction, from among the viewing directions V1 to V8, each viewer is observing the object OBJ.

Now, refer back to FIG. 14. The control unit of each shutter glasses selects images from among the first image DI1 to the fourth image DI4 as the images to be viewed by the right eye and the left eye of the glasses, respectively, based on the thus determined viewing direction (S18). That is, the control unit selects a pair of images so that they can be seen as those disposed most horizontally relative to a viewer located in each viewing direction. What is meant here by "a pair of images disposed most horizontally" is a pair of two images that are selected to have the minimum angle relative to a horizontal direction. If there are a plurality of candidates for the image pair, one located further away from the viewer will be selected. More specifically, if the viewing direction is V8, the image to be seen by the right eye of the glasses will be the first image DI1 and the image to be seen by the left eye thereof will be the fourth image DI4. Also, if the viewing direction is V3, the image to be seen by the right eye thereof will be the fourth image DI4 and the image to be seen by the left eye thereof will be the third image DI3.

The control unit of the shutter glasses sets the open/close timings of the left-eye shutter and the right-eye shutter so that the pair of images selected in Step S16 can be observed by the left and right eyes (S20). This setting of the timings is performed for each shutter glasses in accordance with the display timings of the first image DI1 to the fourth image DI4 at each phase as shown in FIG. 11. In other words, the open/close timing is set so that when the image to be seen by the right eye is displayed at a certain phase, the right-eye shutter of glasses is opened; the open/close timing is set so that when the other images are displayed, the right-eye shutter thereof is closed. Similarly, the open/close timing for the left-eye shutter of glasses is set so that when the image to be seen by the left eye is displayed, the left-eye shutter of glasses is opened; the open/close timing for the left-eye shutter thereof is set so that when the other images are displayed, the left-eye shutter thereof is closed.

By controlling the setting as described above, a pair of images to be seen are determined for each shutter glasses of a viewer existing on the periphery of the display region 40 so that the viewer can recognize a stereoscopic image. Also, the open/close timings of the shutter glasses can be set in accordance with the determined pair of images. Thus, there is no need to prepare for shutter glasses whose open/close timings have been set in accordance with the orientation of a viewer relative to the display region 40. Further, even if the viewer moves around the display region 40 and thereby the orientation changes, a 3D image can still be recognized according to the changed orientation as long as a sequence of displaying the orientation confirmation images is provided.

The display time duration of the orientation confirmation image is preferably set close to the minimum time duration required for an image taking by the compact camera of the shutter glasses. As a result, the possibility that each viewer may direct his/her attention to images other than the object OBJ can be eliminated. Also, the display sequence of the orientation confirmation image can be carried out, as needed, while the object is being displayed.

As another method, an arrangement may be such that the orientation confirmation image cannot be seen by the viewer with both the left-eye shutter and the right-eye shutter closed during the display of the orientation confirmation image. In this case, the projection-type image display apparatus transmits a signal to a transceiver unit of each shutter glasses immediately before or during the display of the orientation confirmation image. And the control unit of the shutter glasses operates to close the shutter during a predetermined period after the receiving of the signal or during the receiving of the signal. With this configuration, the viewer will not be bothered by the orientation confirmation image and the viewer can recognize a stereoscopic image immediately after the shutter is opened.

The orientation of a viewer relative to the object is a vital factor to properly recognize the stereoscopic image. Hence, it is preferable that the display position of the orientation confirmation image is set near the object as shown in FIG. 13. When, in this manner, the orientation confirmation image is displayed in the center of the object, there is almost no deviation between the orientation of a viewer relative to the object and the orientation of a viewer relative to the orientation confirmation image, which is considered more preferable.

Figure 16:
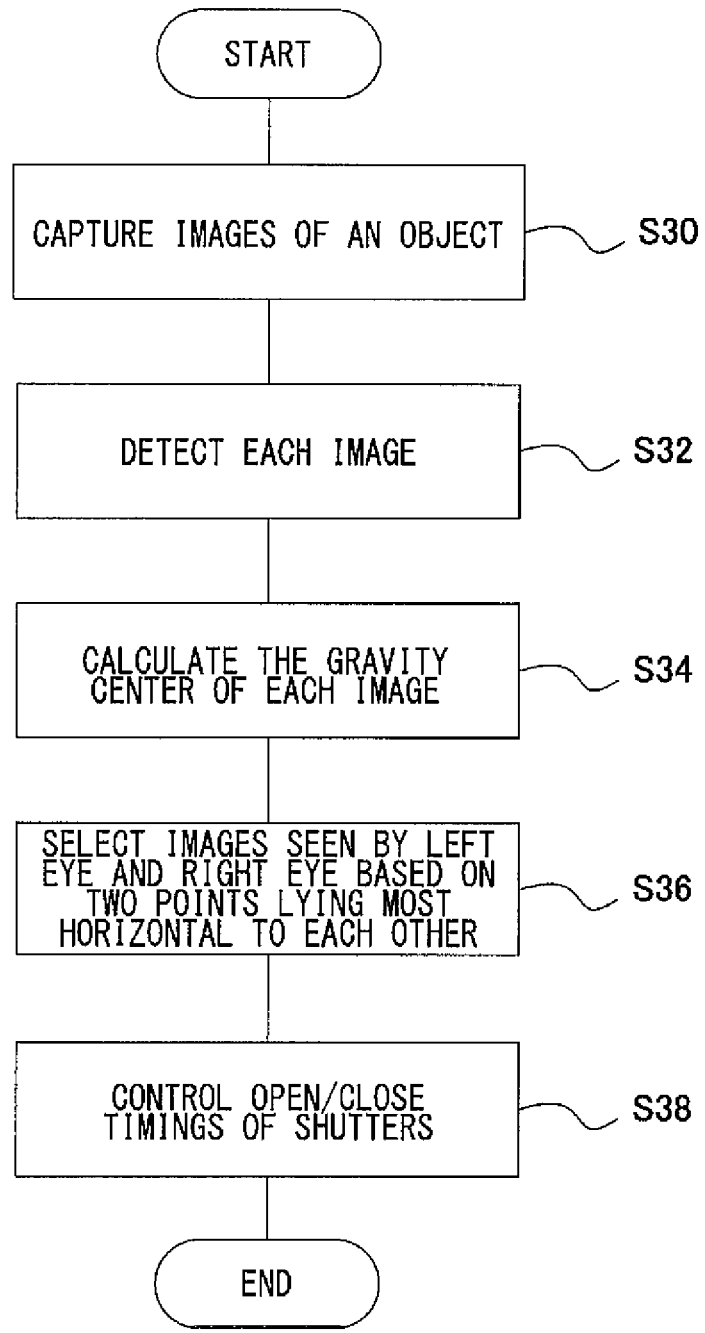
FIG. 16 is a flowchart showing a modification to the process shown in FIG. 14.

FIG. 16 is a flowchart showing a modification to the process shown in FIG. 14.

Figure 17:
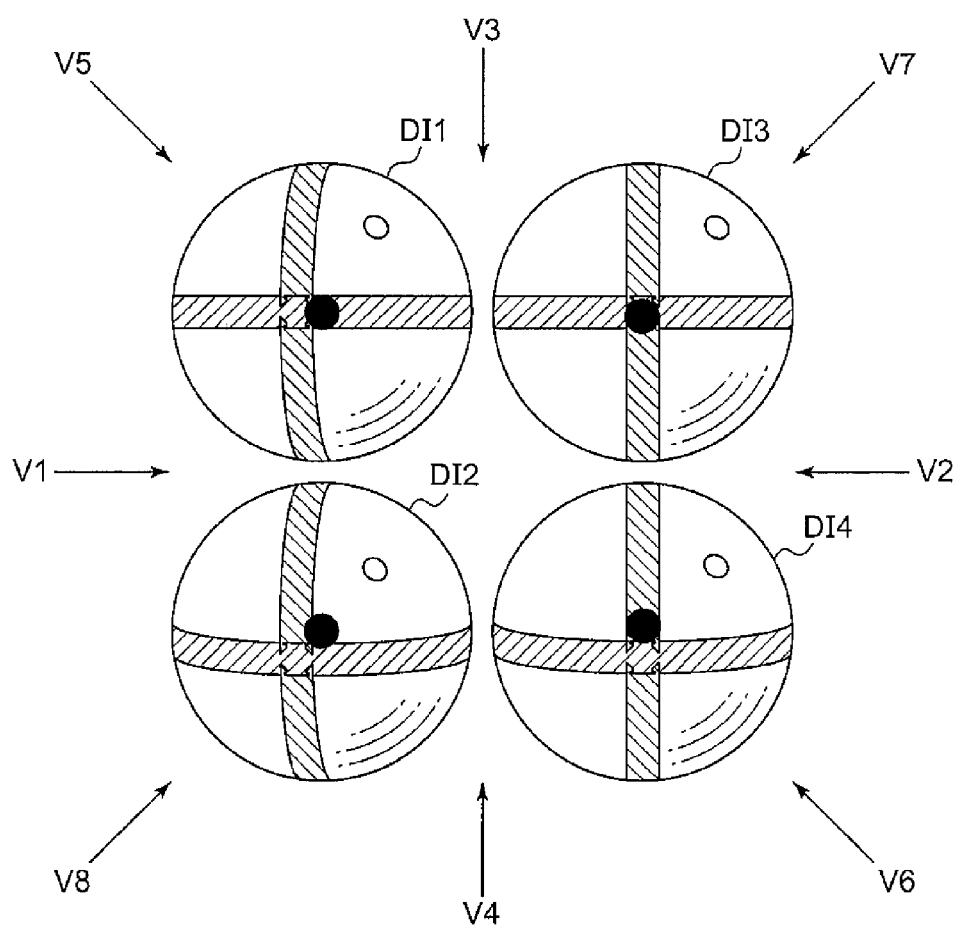
FIG. 17 illustrates the gravity centers of parallax images DI1 to DI4.

With a viewer existing on the periphery of the display region 40 of an object OBJ, the projection-type image display apparatus first displays the object OBJ in the display region 40 and then the compact camera attached to the shutter glasses takes images of a region containing the object (S30). The control unit in the shutter camera detects the parallax images DI1 to DI4 by the pattern matching between the images taken and the parallax images, in the object, recorded beforehand (S32). Then the control unit calculates the gravity centers of the parallax images DI1 to DI4 (S34). FIG. 17 illustrates the gravity centers of parallax images DI1 to DI4 with black circles. Instead of the gravity center, the mid points of width and height for each image may simply be calculated. As a result, four gravity centers are obtained.

The control unit selects two points lying most horizontal to each other, from among the four gravity centers, and selects images containing these selected two gravity centers as those which are to be seen by the left eye and the right eye of each viewer (S36). If there are a plurality of image pairs placed horizontally, an image pair located further away from the viewer will be selected. For example, suppose that the viewer exists in the direction V4, then there are an image pair of DI1 and DI3 and another image pair of DI2 and DI4 as the image pairs having the gravity centers lying horizontally. In this example, the former is selected as the image pair lying further away. The control unit of the shutter glasses sets the open/close timings of the left-eye shutter and the right-eye shutter so that the images selected in Step S16 can been seen by the left and right eyes (S38).

As described above, in this modification, figural features of the object itself are used to determine the orientation of the viewer, instead of displaying the object and the orientation confirmation image therefor. As a result, the supply of the display sequence of the orientation confirmation images is no longer required and therefore the orientation can be set by the shutter glasses as needed while the object is being displayed in the display region 40. Also, the viewer is no longer conscious of any orientation confirmation images. In the present embodiment and modification, the position of each parallax image is represented by the center of gravity, but it is not limited thereto and, for example, the position thereof may be expressed by the center, the feature point or so forth of each image.

In FIG. 13 to FIG. 17, a description has been given of a case where the object OBJ has four parallax images. However, the above-described methods are not limited to such a case only, and are also applicable to the case where there are three parallax images or five or more parallax images.

A description has been given so far of a method for determining the viewing directions in a case where the display region is set to the floor. In contrast thereto, a description is now given of a case where a wall surface is set to the display region. In this case, which particular one of a plurality of parallax images displayed on the wall surface is to be observed in order to recognize a stereoscopic image depends on the orientation of the viewer relative to the wall surface. Thus, a method different from the method used in the case of the floor needs to be implemented.

Figure 18:
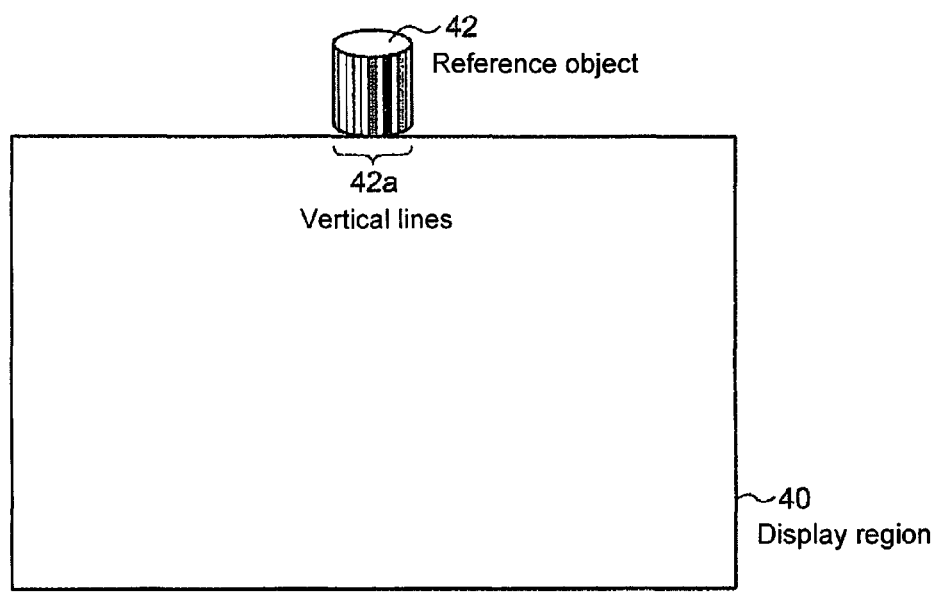
FIG. 18 is an illustration explaining a method for determining a viewing direction when the wall surface is used as a display region.

FIG. 18 is an illustration explaining a method for determining a viewing direction when the wall surface is used as the display region 40. The projection-type image display apparatus projects an image of the object onto the display region 40 of the wall surface. At this time, a reference object, which changes its color, shape or pattern according to the orientation of the viewer relative to the object displayed on the wall surface, is placed on the periphery of the display region 40 (e.g., on top of the display region 40). In the example of FIG. 18, a cylindrical reference object 42 is placed on top of the display region 40 wherein five vertical lines 42 are drawn on the outer surface of the reference object 42. The vertical lines 42a come in different colors of yellow, green, red, blue and orange, for example, from left to right. The degree of curvature in the reference object 42 and the arrangement of vertical lines are varied and set as appropriate. Accordingly, how the reference object 42 is seen can be made to differ according to the viewing directions, so that the viewing directions can be determined.

The shape of the reference object 42 is not limited to a cylindrical form as long as it has an outwardly curved surface or inwardly curved surface. Also, instead of the vertical lines that differ in color, lines having different shape or patterns may be placed as long as how the reference object 42 is seen can be made to differ.

Figure 19:
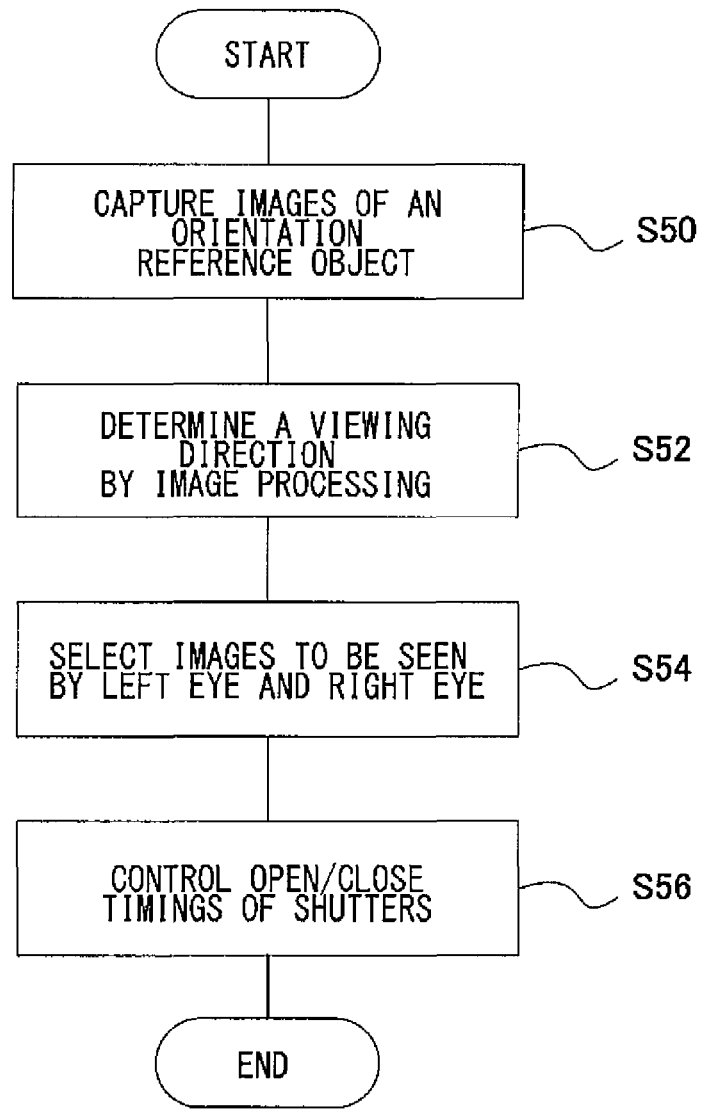
FIG. 19 is a flowchart explaining a process for determining a viewing direction when a reference object is placed.

FIG. 19 is a flowchart explaining a process for determining a viewing direction when a reference object is placed.

With a viewer existing on the periphery of the display region 40 of an object OBJ, the projection-type image display apparatus first displays the object OBJ in the display region 40 of the wall surface and then the compact camera attached to the shutter glasses takes images of a region containing the reference object (S50). The control unit in the shutter camera detects the reference object 42 from within the region by taking the matching over patterns, such as the color or pattern of the reference object surface, recorded beforehand and at the same time determines the viewing direction of the viewer based on the arrangement of color or pattern (S52).

The control unit of the shutter glasses selects images to be seen by the left and right eyes of the viewer, from among a plurality of parallax images contained in the object (S54). Then the control unit of the shutter glasses sets the open/close timings of the left-eye shutter and the right-eye shutter in synchronization with the display timing of the object so that the selected images can be observed by the left and right eyes (S56).

Figure 20:
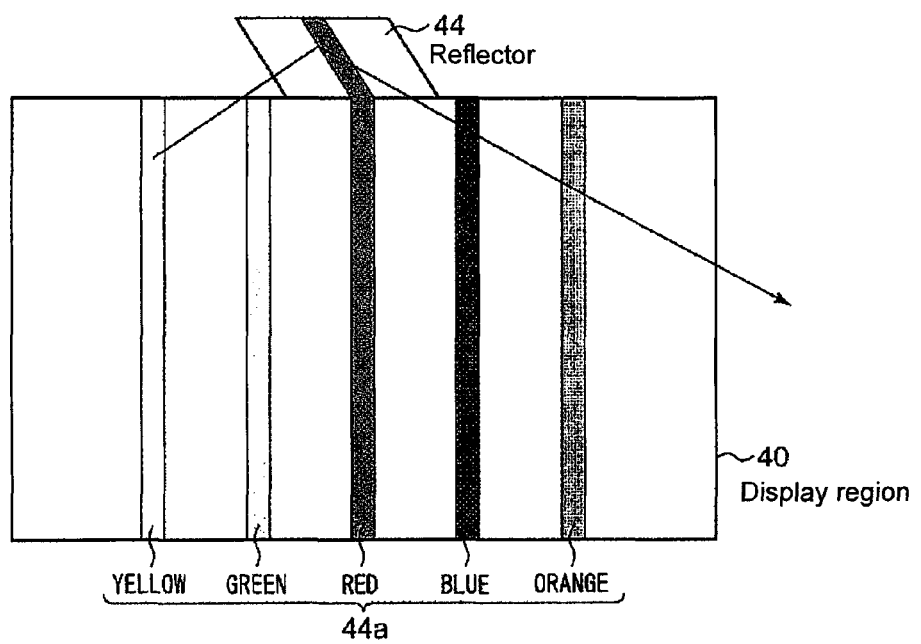
FIG. 20 shows a modification where a reflector such as a mirror is placed in place of the reference object.

FIG. 20 shows a modification where a reflector 44 such as a mirror is used and placed in place of the reference object 42. The reflector 44 is placed near the display region 40, preferably on top of the display region 40, and is tilted by a predetermined angle relative to the orientation of the viewer. It is preferable that the predetermined angle be determined according to the distance between the viewer and the wall surface on which the display region is projected, and so forth.

With the reflector 44 placed on top of the display region 40, the projection-type image display apparatus projects the orientation confirmation image onto the display region 40 before the objection is displayed. The orientation confirmation image contains five vertical lines 44a similar to those in the example of FIG. 18 wherein the yellow, green, red, blue and orange colors, arranged in this order, constitute the five vertical lines 44a, respectively. It is preferable that the number of vertical lines to be displayed as the confirmation image be determined according to the angular coverage of the viewer relative to the object projected onto the display region. Setting appropriately the setup angle of the reflector and the arrangement of the vertical lines makes it different how the confirmation image 44a projected onto the reflector 44 is seen, according to the viewing directions. Thus, the viewing directions can be determined.

Similar to the example of FIG. 19, instead of the vertical lines having the different colors, an arbitrary figure with different colors, shapes, patterns or the like may be projected as the orientation confirmation image 44a as long as how the figure is seen can be made to differ according to the viewing directions. Also, the reflector 44 may use a curved mirror or curved mirrors in regions other than the flat plane as long as the orientation confirmation image can be reflected toward the viewer.

Figure 21:
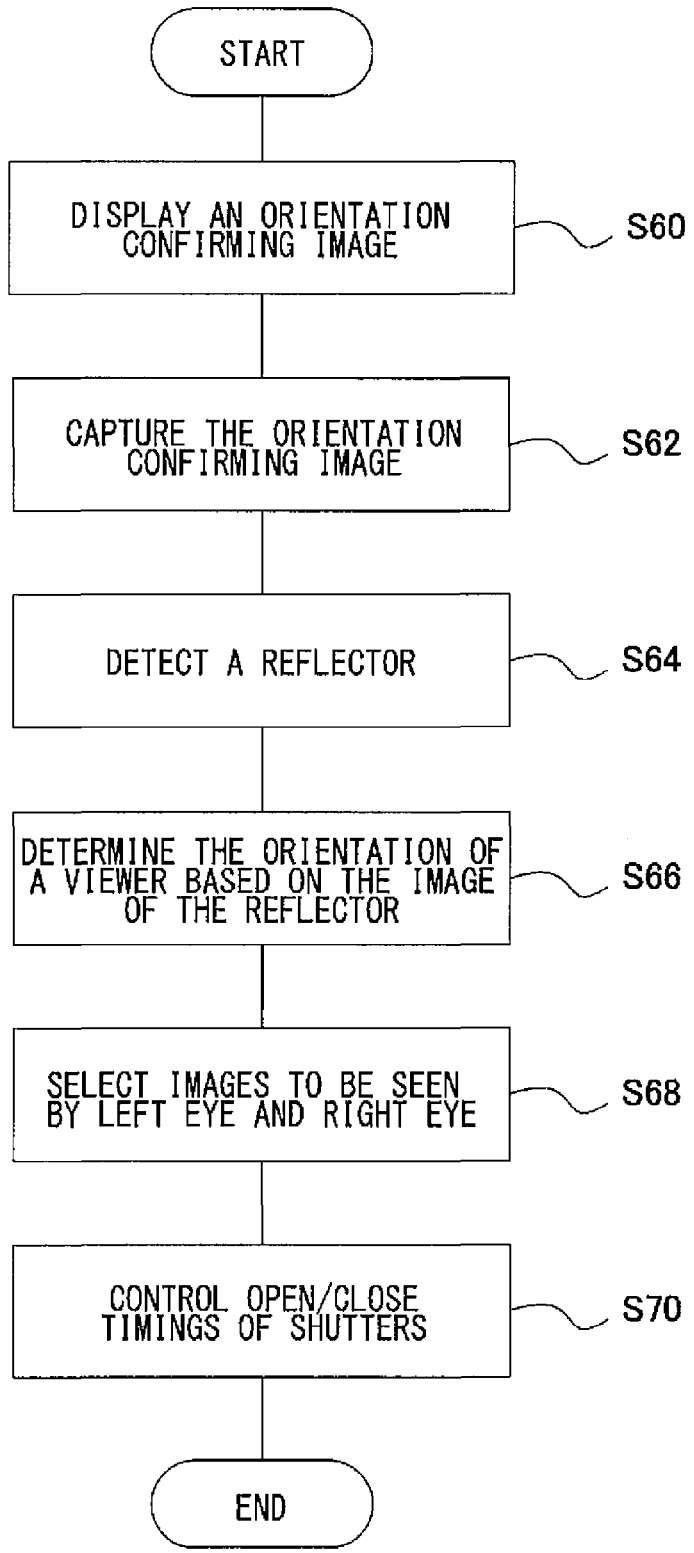
FIG. 21 is a flowchart explaining a process for determining a viewing direction when a reflector is placed.

FIG. 21 is a flowchart explaining a process for determining a viewing direction when a reflector is placed.

With the viewer existing on the periphery of the display region 40 of the object OBJ, the projection-type image display apparatus first carries out a sequence of processes involved in projecting the orientation confirmation image onto the display region 40 of the wall surface before displaying the object OBJ (S60). The compact camera attached to the shutter glasses worn by a viewer takes an image of a region containing the orientation confirmation image (S62). The control unit in the shutter camera detects the reflector 44 from within the region by taking the matching over patterns, such as the color or pattern, recorded beforehand (S64) and at the same time determines the viewing direction of the viewer based on the color or pattern projected on the reflector 44 (S66). For example, in the example of FIG. 20, the yellow line, which is projected on the leftmost vertical line of the display region 40 and reflected by the reflector 44, is captured (see the arrow in FIG. 20), so that the viewing direction of the viewer can be determined.

The control unit of the shutter glasses selects images to be viewed by the right eye and the left eye of the glasses, from among a plurality of parallax images contained in the object (S68). Then the control unit of the shutter glasses sets the open/close timings of the left-eye shutter and the right-eye shutter in synchronization with the display timing of the object so that the selected images can be observed by the left and right eyes (S70).

By controlling the setting as described above, the images to be seen are determined for each shutter glasses of a viewer existing on the periphery of the display region 40 so that the viewer can recognize a stereoscopic image. Also, the open/close timings of the shutter glasses can be set in accordance with the thus determined images. Thus, there is no need to prepare for shutter glasses whose open/close timings have been set in accordance with the orientation of a viewer relative to the display region 40. Further, even if the viewer moves around the display region 40 and thereby the orientation changes, a 3D image can still be recognized according to the changed orientation as long as a sequence of displaying the orientation confirmation images are provided.

Similar to the example of FIG. 13, the display time duration of the orientation confirmation image is preferably set close to the minimum time duration required for the image taking by the compact camera of the shutter glasses. Also, an arrangement may be such that the orientation confirmation image cannot be seen by the viewer with both the left-eye shutter and the right-eye shutter closed during the display of the orientation confirmation image. In this case, the projection-type image display apparatus transmits a signal to the transceiver unit of each shutter glasses immediately before or during the display of the orientation confirmation image. And the control unit of the shutter glasses operates to close the shutter during a predetermined period after the receiving of the signal or during the receiving of the signal. With this configuration, the viewer will not be bothered by the orientation confirmation image and the viewer can recognize a stereoscopic image immediately after the shutter is opened.

Reference Example

A description is next given of an image display system 50 according to a reference example. In this reference example, the display timings of a plurality of region images and the open/close timing of shutter glasses to be worn by the viewer are controlled. As a result, even if an object OBJ is not symmetric bilaterally and vertically, a stereoscopic image giving no sense of discomfort can be provided.

Arrangement of Image Display System

Figure 22:
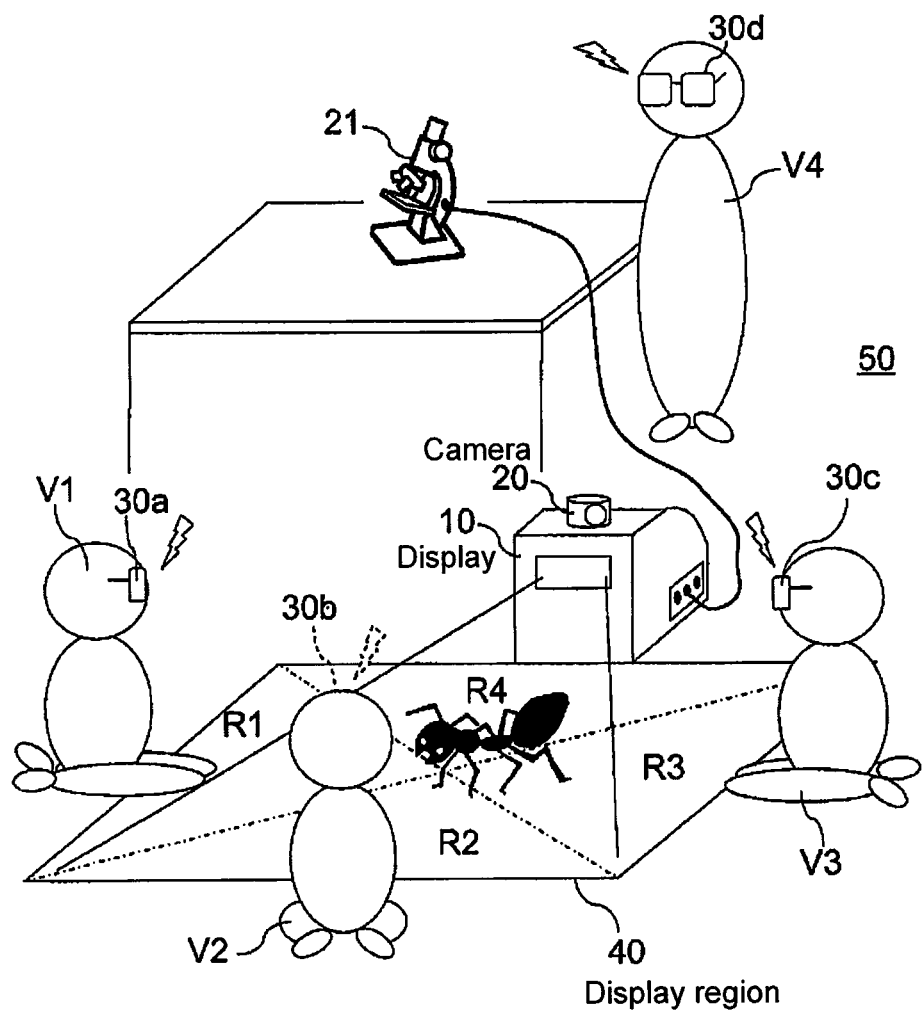
FIG. 22 is an illustration showing an arrangement of an image display system according to a reference example.

FIG. 22 is an illustration showing an arrangement of an image display system 50 according to the reference example. The image display system 50 includes a projection-type image display apparatus 10, a camera 20, a microscope 21, first eyeglasses 30a, second eyeglasses 30b, third eyeglasses 30c, and fourth eyeglasses 30d.

The projection-type image display apparatus 10 as an image display unit displays an image (RI1) of a first region R1, an image (RI2) of a second region R2, an image (RI3) of a third region R3, and an image (RI4) of a fourth region of an object OBJ onto a predetermined display region 40. The first region image RI1, the second region image RI2, the third region image RI3, and the fourth region image RI4 of the object OBJ have predetermined parallaxes, respectively, and are displayed in a time-division manner.

The camera (e.g., CCD camera) 20 takes images of the 360-degree periphery around the projection-type image display apparatus 10 and supplies them to the projection-type image display apparatus 10. The projection-type image display apparatus 10 determines the positions of the respective glasses from among the images supplied from the camera 20. That is, where each of pairs of eyeglasses (i.e., the first eyeglasses 30a, the second eyeglasses 30b, the third eyeglasses 30c and the fourth eyeglasses 30d) lies in a position corresponding to any one of the regions R1, R2, R3 and R4 of the display region 40 is determined by the projection-type image display apparatus 10.

The microscope 21 captures images of an object placed on a prepared slide, as a plurality of images having parallaxes, and supplies the plurality of images to the projection-type image display apparatus 10. The images captured by the microscope 21 may be supplied to the projection-type image display apparatus 10 by way of a not-shown personal computer.

The first eyeglasses 30a are worn by a first viewer V1 who sees the first region image RI1 displayed on the first region of the display region 40. Similarly, the second eyeglasses 30b are worn by a second viewer V1 who sees the second region image RI2 displayed on the second region thereof. The third eyeglasses 30c are worn by a third viewer V3 who sees the third region image RI3 displayed on the third region thereof. The fourth eyeglasses 30d are worn by a fourth viewer V4 who sees the fourth region RI4 displayed on the fourth region thereof.

Example of Object Display

Figure 23:
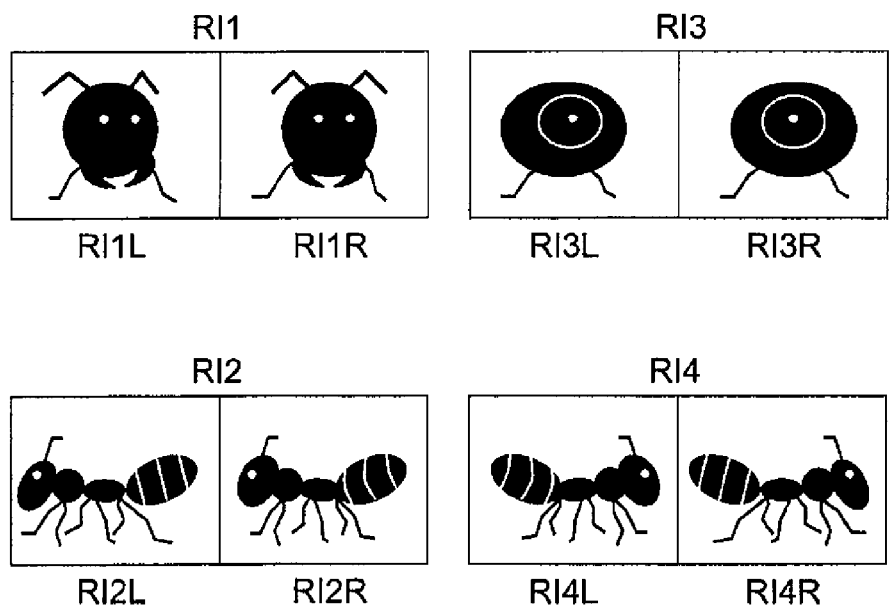
FIG. 23 illustrates a first region image, a second region image, a third region image and a fourth region image to be displayed on a display region.

FIG. 23 illustrates the first region image RI1, the second region image RI2, the third region image RI3, and the fourth region image RI4 to be displayed on the display region 40.

The first viewer V1 sees a right-eye image RI1R and a left-eye image RI1L of the first region image RI1. The second viewer V2 sees a right-eye image RI2R and a left-eye image RI2L of the second region image RI2. The third viewer V3 sees a right-eye image RI3R and a left-eye image RI3L of the third region image RI3. The fourth viewer V4 sees a right-eye image RI4R and a left-eye image RI4L of the fourth region image RI4.

The opening and closing of the shutters are controlled in such a manner that the first eyeglasses 30a has the right eye of the first viewer V1 see the right-eye image RI1R of the first region image RI1 and has the left eye thereof the left-eye image RI1L of the first region image RI1. Similarly, the opening and closing of the shutters are controlled in such a manner that the second eyeglasses 30b, the third eyeglasses 30c and the fourth eyeglasses 30d have the right eyes and the left eyes of the respective viewers see the right-eye images and the left-eye images of the respective region images.

One unit of frame image is displayed at 120 Hz on the assumption that the right-eye image and the left-eye image of each region image are displayed at 60 Hz.

Arrangement of Other Example

In the above reference example, the microscope 21 is used in the explanation, but an ordinary camera (capable of capturing a plurality of images having parallax with respect to each other) may be used as a means for taking images in preparing stereoscopic 3D images. Also, the arrangement may be such that images are taken from an existing database of stereoscopic images.

In the above reference example, the display region 40 is assumed to be projected on an ordinary screen or on a floor. However, the screen may be an interactive board, such as a touch panel. In such a case, the screen may be so set that the portion touched on the screen is displayed at the center of the screen or that the part enclosed in a circle is enlarged in display.

Also, the screen may be so set that not only the images captured by a microscope or the like as described previously but also images of animals or the like taken from a database, such as an electronic field guide, are displayed. In such a case, a text of the explanatory label on the animal shown may be displayed by the side of its stereoscopic image. Then the viewer may find it easier to read if the text part is displayed two-dimensionally, that is, as an image without parallax.

Also, the screen may be so arranged that by having the camera 20 recognize a card depicting feed, the animal eating the feed may be displayed. If the projector-type image display apparatus 10 is used, the shadow of a hand or the like does not easily enter the stereoscopic image displayed, so that no loss of the stereoscopic image will be caused by the holding out of the card or the like.

Also, the screen may be so set that images of dinosaurs or the like are displayed from a card incorporating an IC chip. In such a case, the image display system will be comprised of a projector-type image display apparatus, a camera, a plurality of eyeglasses, and a card reader.

Where the content is such as described above, the realistic sensation will be increased if some means is provided that can send air (wind), water, scents or the like toward the viewers in addition to the stereoscopic images. Or the screen may be so set that the stereoscopic image initiates an action, for instance, when the camera 20 detects the approach of a hand of a viewer or the like.

In the above reference example, the camera 20 is used to determine which of the regions R1, R2, R3, and R4 the positions of the respective eyeglasses 30 correspond to, that is, which of the regions are approximately in front of the respective viewers. However, utilization of the camera 20 is not limited to such an application only. The camera 20 may be used to create a room-wide image or an indoor image by integrating the images outputted therefrom which are divided for 360 degrees.

Other Embodiments

The present invention has been described by referring to the embodiments and such description is for illustrative purposes only. It is understood by those skilled in the art that any arbitrary combinations of the constituting elements and processes could be developed as modifications and that such modifications are also within the scope of the present invention.

Consideration of the second embodiment indicates that the eyeglasses 30 to be worn by the viewers are each supposed to show the viewer two images selected according to the position of the viewer out of three or more images having predetermined parallax with each other. More specifically, the eyeglasses 30 are supposed to show the viewer two images that have the parallax in the direction most perpendicular to the line of sight of the viewer, out of the three or more images. What is meant by "two images that are selected to have a parallax in the direction most perpendicular to the line of sight of the viewer" is two images that are selected to have the minimum angle relative to a direction perpendicular to the line of sight of the viewer.

Where shutter glasses capable of variable control of opening and closing timing are employed, the image analysis unit 12 identifies the position of the viewer from the image captured by the camera 20. A not-shown glasses control unit generates a control signal to set the eyeglasses 30 for an open/close timing therefor according to the position of the viewer, and the synchronization signal transmitter 16 transmits the control signal to the eyeglasses 30. Note that this control can be made whether there is one or a plurality of viewers. By executing this control in real time, it is possible to show the viewers a combination of stereoscopic images constantly even when the direction of viewing the object changes with the movement of the viewers.

While the preferred embodiments of the present invention, the modifications to the embodiments, and other examples have been described using specific terms, such description is for illustrative purposes only, and it is to be understood that changes and variations may further be made without departing from the spirit or scope of the appended claims.

What is claimed is:

1. A stereoscopic image display system comprising:
   an image display unit which displays three or more images, having predetermined parallaxes therebetween, on a predetermined display region formed onto a floor by dividing the three or more images temporally or spatially; and
   eyeglasses to be worn by each of viewers who sees the images displayed on the display region, the viewers stand on the floor as surrounding the predetermined display region,
   wherein said eyeglasses is controlled to perform a function of having the viewer see two images of the three or more images identified according to the position around the predetermined display region of the viewer wearing said eyeglasses,
   wherein said eyeglasses perform a function of having the viewer see a pair of two images that have a parallax in the direction most perpendicular to the line of sight of the viewer, out of the three or more images, and
   wherein said eyeglasses include:
   a single camera which captures an image to be displayed on the flat display region, the camera being attached to the eyeglasses; and
   a control unit which determines two images, to be shown to the viewer, out of the three or more images,
   wherein when a two-dimensional prepared orientation confirmation image is displayed on the flat display region by said image display unit, the control unit has the single camera capture an image of the orientation confirmation image;
   wherein the orientation confirmation image is of such a shape that how the orientation confirmation image is seen differs depending on the line of sight of the viewer,
   wherein the control unit determines the line of sight of the viewer based on the orientation of the captured orientation confirmation image,
   wherein the control unit selects a pair of two images that have a parallax in the direction most perpendicular to the determined line of sight of the viewer, and
   wherein the control unit performs a function of having the viewer see the selected two images.

2. A stereoscopic image display system according to claim 1, said eyeglasses including:
   a camera which takes an image to be displayed on the display region; and
   a control unit which determines two images, to be shown to the viewer, out of the three or more images,
   wherein when the three or more images having predetermined parallaxes therebetween are displayed on the display region by said image display unit, the control unit has the camera take the three or more images,
   wherein the control unit calculates positions of the three or more images,
   wherein the control unit selects two positions lying most horizontal to each other, from among the positions thereof, and
   wherein the control unit performs a function of having the viewer see two images containing the selected two positions.

3. A stereoscopic image display system according to claim 1, further comprising a reference object, placed near the display region, which is seen differently depending on the line of sight of the viewer,
   said eyeglasses including:
   a camera which takes an image to be displayed on the display region; and
   a control unit which determines two images, to be shown to the viewer, out of the three or more images,
   wherein the control unit takes an image of the reference object by the camera,
   wherein the control unit detects the reference object from the image taken by the camera,
   wherein the control unit determines the line of sight of the viewer based on how the detected reference object is seen,
   wherein the control unit selects a pair of two images that have a parallax in the direction most perpendicular to the line of sight of the viewer, and
   wherein the control unit performs a function of having the viewer see the selected two images.

4. A stereoscopic image display system according to claim 1, further comprising a reflector, placed near the display region, which reflects an image in the display region toward the viewer,
   said eyeglasses including:
   a camera which takes an image to be displayed on the display region; and
   a control unit which determines two images, to be shown to the viewer, out of the three or more images,
   wherein when an orientation confirmation image is displayed on the display region by said image display unit, the control unit has the camera take an image of a region containing the reflector; wherein how the orientation confirmation image is seen differs depending on the line of sight of the viewer,
   wherein the control unit detects the reflector from the image taken by the camera,
   wherein the control unit determines the line of sight of the viewer based on the orientation confirmation image projected on the reflector,
   wherein the control unit selects a pair of two images that have a parallax in the direction most perpendicular to the line of sight of the viewer, and
   wherein the control unit performs a function of having the viewer see the selected two images.

5. A stereoscopic image display system according to claim 1, wherein said image display unit is a projection-type image display apparatus which projects the image onto a predetermined projection plane.

6. The stereoscopic image display system of claim 1, wherein the image display unit displays three or more images for polarized glasses.

* * * * *